United States Patent [19]

Yoshida

[11] Patent Number: 4,694,647
[45] Date of Patent: Sep. 22, 1987

[54] HYDRAULIC CIRCUIT SYSTEM FOR USE IN HYDRAULICALLY OPERATED VEHICLES

[75] Inventor: Kazuhiro Yoshida, Hirakata, Japan

[73] Assignee: Kabushiki Kaisha Komatsu Seisakusho, Tokyo, Japan

[21] Appl. No.: 845,294

[22] Filed: Mar. 28, 1986

[51] Int. Cl.⁴ .............................................. F16D 31/02
[52] U.S. Cl. ........................................ 60/442; 60/468; 60/493; 60/494; 91/461
[58] Field of Search ................ 60/468, 435, 442, 487, 60/488, 489, 493, 494; 91/461

[56] References Cited

U.S. PATENT DOCUMENTS

| | | | |
|---|---|---|---|
| 4,194,365 | 3/1980 | Stoufflet et al. | 60/468 |
| 4,481,770 | 11/1984 | Lohbauer et al. | 60/468 X |
| 4,495,767 | 1/1985 | Akiyama et al. | 60/468 X |
| 4,586,332 | 5/1986 | Schexnayder | 60/493 X |
| 4,615,174 | 10/1986 | Nagahara | 60/442 |

FOREIGN PATENT DOCUMENTS 59-65601 4/1984 Japan.

Primary Examiner—Edward K. Look
Attorney, Agent, or Firm—Armstrong, Nikaido, Marmelstein & Kubovcik

[57] ABSTRACT

A hydraulic circuit system for use in hydraulically operated vehicles having a bidirectionally rotatable hydraulic motor with a brake unit, a directional control valve for controlling a pressurized fluid supply to the motor, bypass circuits connected between a fluid supply circuit and a drain circuit, a shadow valve provided in the bypass circuits, and an ON-OFF changeover valve provided in the bypass circuits for allowing the bypass circuits to connect with and disconnect from the shadow valve. The system further includes a cavitation preventing circuit device connected through check valves between the bypass circuits and the shadow valve so as to allow the bypass circuits to communicate with each other in co-operation with the shadow valve.

4 Claims, 4 Drawing Figures

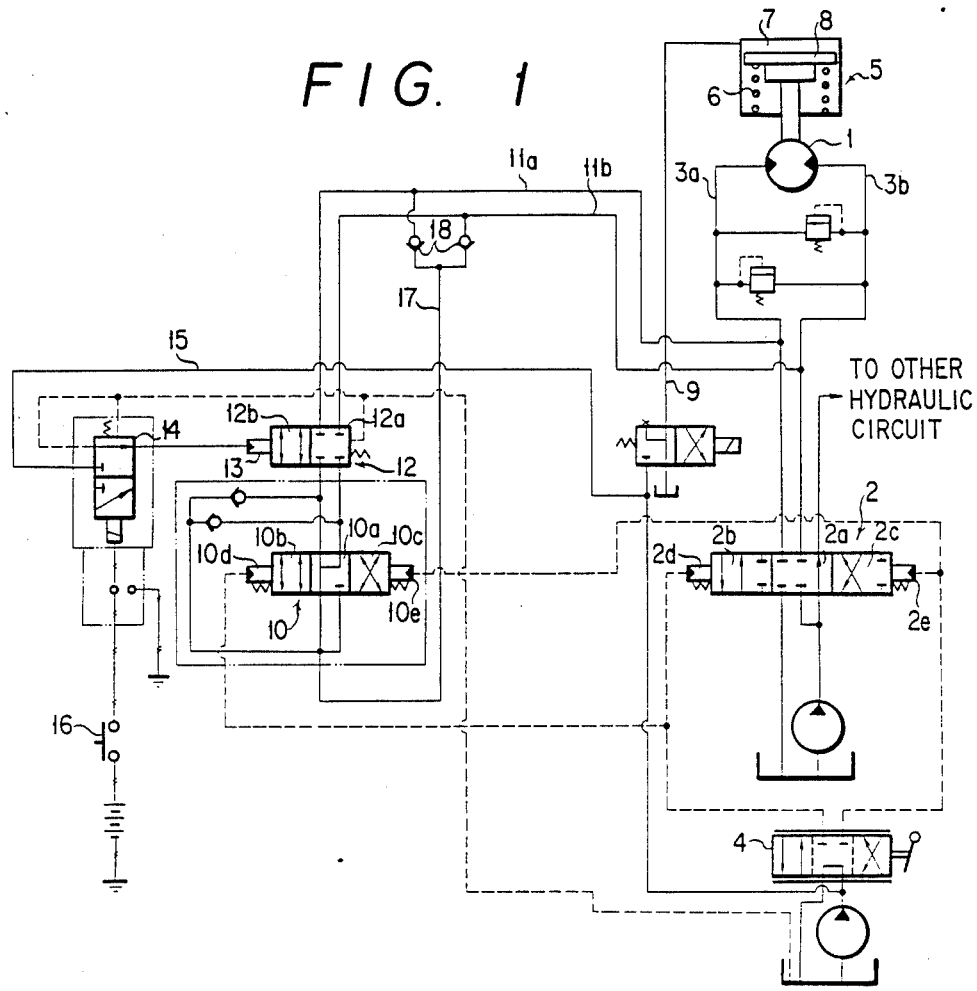
F I G. 1

HYDRAULIC CIRCUIT SYSTEM FOR USE IN HYDRAULICALLY OPERATED VEHICLES

BACKGROUND OF THE INVENTION

1. Field of the Invention:

This invention relates to a hydraulic circuit system for use in hydraulically operated vehicles such as, for example, a hydraulic power shovel, and more particularly to a hydraulic circuit system for controlling a slewing motor associated therewith.

2. Description of the Prior Art:

As for the system for controlling the slewing motor associated with a hydraulic power shovel, there have so far been employed two kinds of modes for controlling the gyratory unit; one is a swivel braking mode wherein when the control lever is located at its neutral position the brake gear is automatically actuated hydraulically or mechanically to forcibly stop the gyratory unit, and the other is a free swivelling mode wherein when the control lever is located at its neutral position the gyratory unit continues to turn by the influence of inertia, and arrangement is made such that the gyratory unit cannot be stopped without operating the control lever reversely or actuating the brake gear separately.

In general, the swivel braking mode, in particular, hydraulic braking mode has posed a problem on fine regulation operability. In effecting underground pipeline laying work which requires suspension of pipes, operability to conduct fine regulation is needed, however, the swivel braking mode tends to cause shock.

Whilst, the free swivelling mode is advantageous in that, when lifting a pipe, the gyratory unit turns of itself to allow the sling wire connected between the leading end of a boom of the power shovel and the pipe and extending diagonally to be tensioned vertically by the force of gravity so as to reduce the swing of the pipe being lifted, so that the pipe lifting work is conducted easily and safely.

In view of the foregoing, it is desirable for the operator to make it possible to use selectively the above-mentioned two kinds of controlling modes depending on the nature of the work to be carried out.

FIG. 4 illustrates a prior art example of hydraulic circuit system arranged such that the above-mentioned two kinds of controlling modes can be used selectively or switched over from one to another mode and vice versa.

In this prior art example, a bypass circuit "d" is provided which bypasses a counterbalancing valve "c" interposed between a slewing motor "a" and a directional control valve "b" adapted to control the slewing motor for switchover thereof. The bypass circuit "d" includes a changeover or control valve "e" which has on and off positions. The arrangement is made such that, when changing over the control valve "e" to its ON position or OFF position by means of a switch "f" and a solenoid valve "g", the slewing motor "a" can be switched over to either the swivel braking mode or the free swivelling mode. Further, the arrangement is made such that when the directional control valve "b" is located at its neutral position and circuits for rotating the slewing motor forwardly and reversely are interconnected.

The above-mentioned prior art system has been disadvantageous in that in case of the free swivelling mode with the control valve "e" changed over to its ON position, the slewing motor "a" is subjected to direct control by the counterbalancing valve "c" thus causing a problem on fine regulation capability in controlling the brake gear when rendered operative.

SUMMARY OF THE INVENTION

The present invention has been made in view of the above-mentioned circumstances, and has for its object to provide a hydraulic circuit system for use in hydraulically operated vehicles, characterized in that it comprises a forwardly and reversely rotatable slewing motor having a brake unit associated therewith and hydraulic fluid circuits for rotating the motor forwardly and reversely; a directional control valve for connecting and disconnecting the fluid circuits with and from a pressurized fluid supply source, said control valve having an OFF position and forward and reverse rotating positions and being remotely controlled by a pilot fluid pressure etc.; bypass circuits, one ends of which are respectively connected to the fluid circuits for rotating the motor forwardly and reversely; a shadow valve having a connecting or communicating position for allowing said bypass circuits to communicate with each other at their respective other ends and disconnecting positions for disconnecting said bypass circuits from each other, the shadow valve being interlocked with the directional control valve to enable interlocked control to be achieved in such a manner that it may assume its communicating position when the directional control valve is located at its off position, while it may assume its disconnecting positions when the directional control valve is located at either forward rotating position or reverse rotating position, and an ON-OFF changeover valve provided in the bypass circuits for allowing the bypass circuits to communicate with and disconnect from the shadow valve. The arrangement is made such that, simultaneously with changeover of the directional control valve, the shadow valve is switched over reversely, and when the directional control valve is located at its cut-off position, the shadow valve assumes its communicating position to allow the circuits for rotating the slewing motor forwardly and reversely to intercommunicate through the bypass circuits thereby turning the slewing motor freely, and connection and disconnection of the bypass circuits by means of the ON-OFF changeover valve enables the above-mentioned free swivelling mode and swivel braking mode to be switched over from one to another mode or vice versa.

Other objects, advantages and features of the present invention will become more apparent to those skilled in the art upon consideration of the accompanying drawings and the following detailed description in which a preferred structural embodiment of the present invention is disclosed.

BRIEF DESCRIPTION OF THE DRAWINGS

FIG. 1 is a schematic hydraulic circuit diagram showing one embodiment of the present invention;

DETAILED DESCRIPTION OF THE PREFERRED EMBODIMENTS

Figure 2:
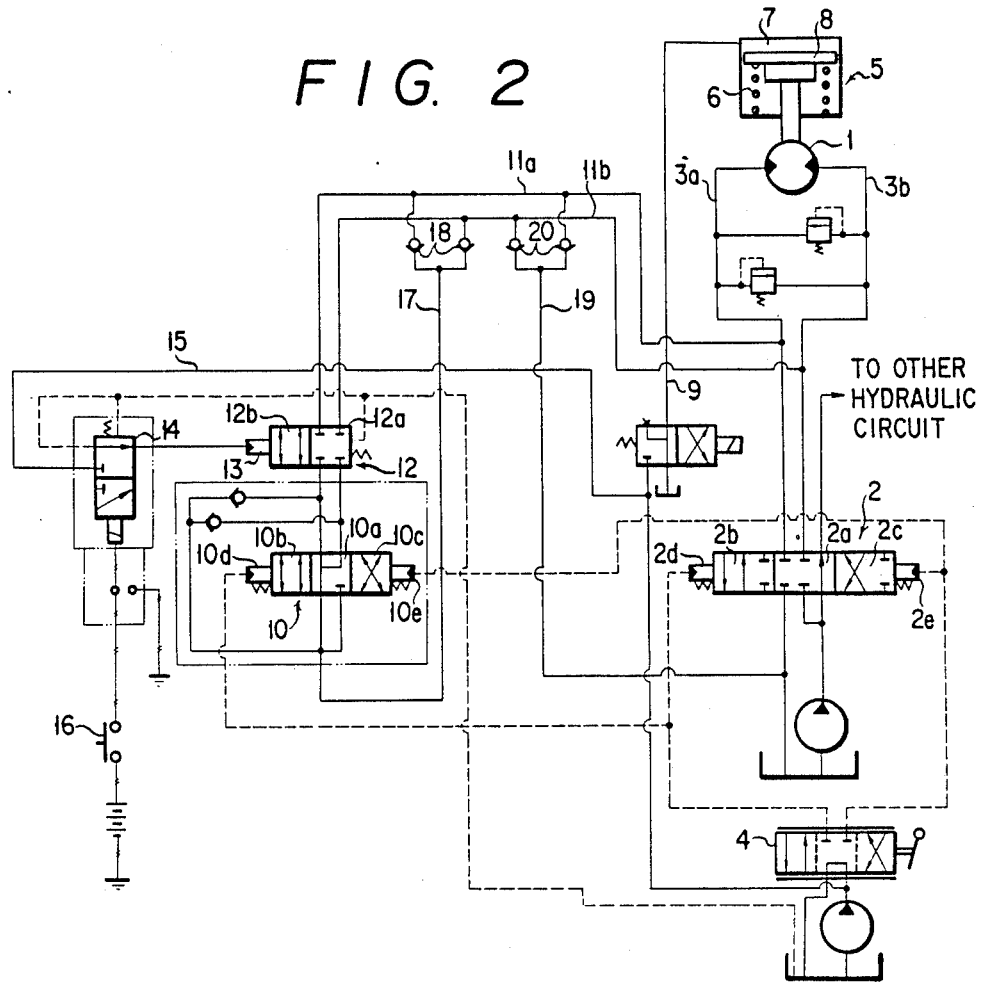
FIG. 2 is a schematic hydraulic circuit diagram showing another embodiment of the present invention.

The present invention will now be described in detail by way of example with reference to FIG. 1. Reference numeral 1 denotes a reversible rotating type slewing motor, and 2 a directional control valve which is connected to the slewing motor 1 by way of a circuit 3a for forward rotation and a circuit 3b for reverse rotation. The directional control valve has a cut-off position 2a located at the centre thereof, a forward rotating position 2b and a reverse rotating position 2c which are located at the left and right thereof, and also left and right pilot fluid pressure applying portions 2d and 2e. This directional control valve is arranged to be switched over from the forward rotating position 2b to the reverse rotating position 2c or vice versa when a pilot fluid pressure is selectively applied to either the left pilot fluid pressure applying portion 2d or the right pilot fluid pressure applying portion 2e. The above-mentioned pilot fluid pressure applying portions 2d and 2e are connected through a proportional position control valve 4 with a pressurized fluid supply source. Reference numeral 5 denotes a brake unit associated with the slewing motor 1. This brake unit 5 is adapted to be rendered inoperative when its pressure chamber 7 is supplied with fluid under pressure, and rendered operative by the resilient force of a spring 6 when the fluid under pressure is expelled out from the pressure chamber 7. The pressure chamber 7 has a brake valve 8 mounted therein and has a brake circuit 9 connected thereto.

Reference numeral 10 denotes a shadow valve which has a connecting or communicating position 10a located at its centre thereof to intercommunicate a first bypass circuit 11a and a second bypass circuit 11b, and left and right disconnecting positions 10b and 10c to disconnect the circuits 11a and 11b, and also pilot fluid applying portions 10d and 10e located at the left and right sides thereof. The shadow valve 10 is arranged to be switched over to either one of disconnecting positions 10b and 10c when one of the pilot fluid pressure applying portions 10d and 10e is supplied with a pilot fluid pressure. Further, the pilot fluid pressure applying portions 10d and 10e of the shadow valve 10 are connected to the pilot fluid pressure applying portions 2d and 2e, respectively, of the directional control valve 2 for the slewing motor 1.

The above-mentioned first and second bypass circuits 11a and 11b are connected through the ON-OFF changeover valve 12 to the circuits 3a and 3b for rotating the slewing motor 1 forwardly and reversely.

This ON-OFF changeover valve 12 is adapted to be switched over to an OFF position 12a by the resilient force of a spring mounted therein, and also to an ON position 12b by a pilot fluid pressure applied to its pilot fluid pressure applying portion 13. The above-mentioned pilot fluid pressure applying portion 13 is connected with a pilot circuit 15 in which a solenoid actuated changeover or control valve 14 is interposed. Reference numeral 16 denotes a switch for changing over the solenoid actuated control valve 14.

Reference numeral 17 indicates a circuit for preventing occurrence of cavitation. This circuit 17 for the prevention of cavitation is arranged to allow the bypass circuits 11a and 11b to communicate with each other through check valves 18 and 18 when the shadow valve 10 is located at its communicating position 10a.

FIG. 2 shows another embodiment of the present invention wherein, in addition to the above-mentioned circuit 17 for the prevention of cavitation, a second circuit 19 for the prevention of cavitation is connected to a drain circuit.

Figure 3:
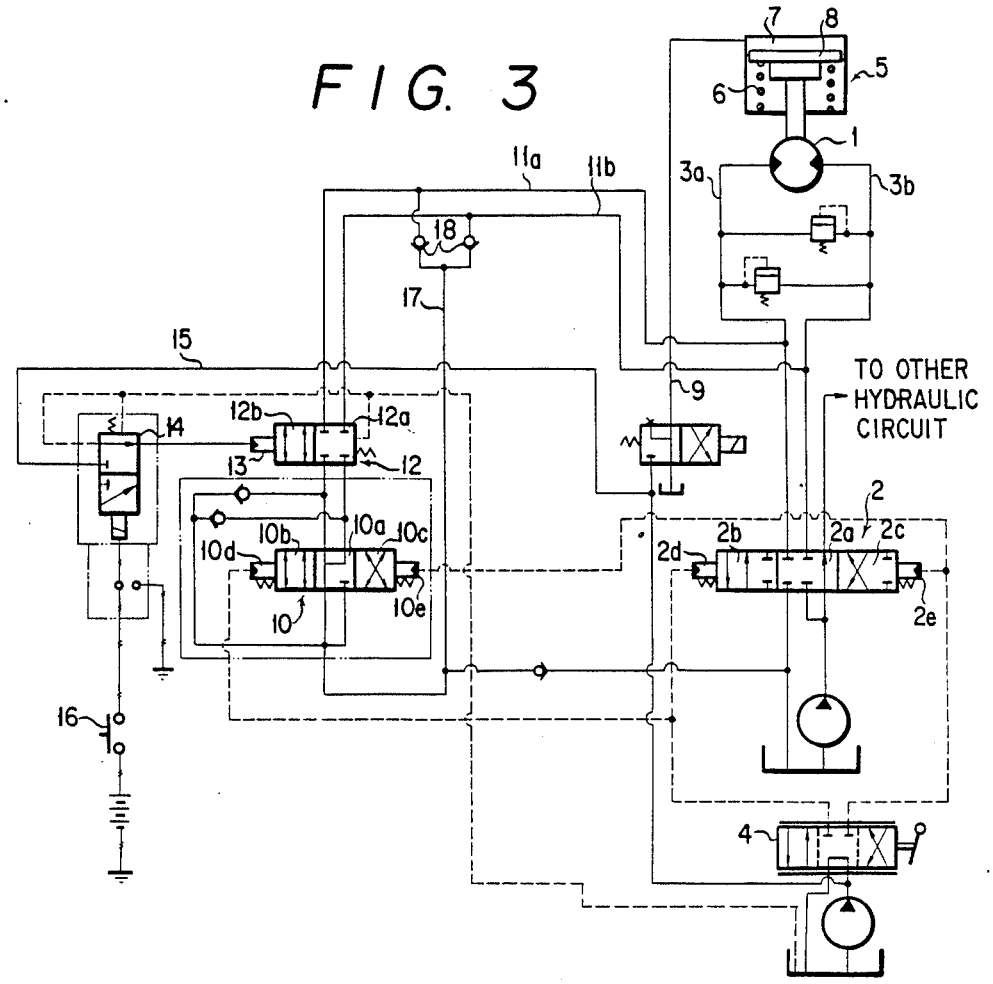
FIG. 3 is a schematic hydraulic circuit diagram showing still another embodiment of the present invention.
Figure 4:
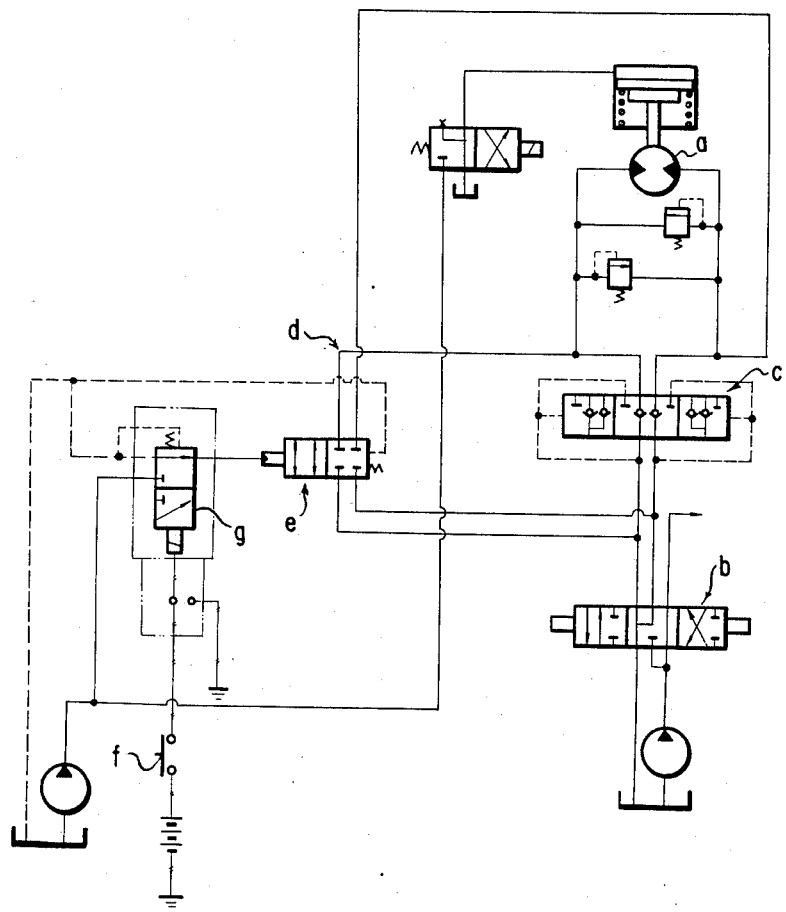
FIG. 4 is a schematic hydraulic circuit diagram showing an embodiment of the prior art.

Further, as an alternative arrangement shown in FIG. 3, the circuit 17 for the prevention of cavitation may be connected to a drain circuit or an oil filter located nearby, through a check valve.

The operation of the above-mentioned arrangement will be described below.

(1) Swivel braking mode (switch 16 is turned off)

When the switch 16 is turned off, the solenoid actuated control valve 14 assumes its OFF position as shown, and the ON-OFF changeover valve 12 is switched over to its OFF position 12a. Therefore, under this condition, the first and second bypass circuits 11a and 11b for connecting the circuits 3a and 3b for rotating the slewing motor 1 forwardly and reversely are disconnected to each other.

If the directional control valve 2 is switched over by means of the proportional position control valve 4 under this condition, then the slewing motor 1 is controlled so as to rotate forwardly or reversely. When the directional control valve 2 is located at its OFF position, the circuits 3a and 3b for forward and reverse rotation of the slewing motor are closed so that the slewing motor 1 is subjected to a braking effect by the hydraulic circuit to thereby stop the slewing motor 1.

At that time, the shadow valve 10 is changed over by the switch-over action of the directional control valve 2, but is not subject to any influence of it, because the first and second bypass circuits 11a and 11b are disconnected by the ON-OFF changeover valve 12.

(2) Free swivelling mode (switch 16 is turned ON)

When the switch 16 is turned on, the solenoid actuated control valve 14 is rendered ON, and consequently the ON-OFF changeover valve 12 is supplied at its pilot fluid pressure applying portion 13 with a pilot fluid pressure from the pilot circuit 15. As a result, the ON-OFF changeover valve 12 is switched over to its ON position 12b so that the first and second bypass circuits 11a and 11b are allowed to interconnect through the shadow valve 10.

If the directional control valve 12 is then switched over by means of the proportional position control valve 4 to control the slewing motor 1, the shadow valve 10 will assume either one of disconnecting positions 10b and 10c provided that the directional control valve 12 is located at its forward rotating position 2b or reversing position 2c by the action of the pilot fluid pressure supplied by the proportional position control valve 4.

Thus, the first and second bypass circuits 11a and 11b are disconnected by the shadow valve 10 so that the slewing motor 1 may be controlled by the directional control valve so as to rotate forwardly or reversely.

When the directional control valve 2 is located at its OFF position 2a, the shadow valve 10 is changed over to its communicating position 10a located at the centre thereof so that the first and second bypass circuits 11a and 11b are allowed to intercommunicate through the shadow valve 10.

As a result, the circuits 3a and 3b for rotating the slewing motor 1 forwardly and reversely are allowed to intercommunicate through the first and second bypass circuits 11a and 11b and the shadow valve 10 so that the slewing motor 1 may continue to rotate under free gyratory condition without subjecting to any braking action.

Stopping of the slewing motor 1 under the above-mentioned condition may be made by operating the control lever 4 of the proportional position control valve reversely or alternatively by changing over the brake valve 8 to actuate the brake 5 unit.

In accordance with the present invention, the slewing motor 1 can be selectively switched over to either the swivel braking mode or the free swivelling mode by switching over the ON-OFF changeover valve 12 to either ON position or OFF position. Further, in case of the free swivelling mode, the operability to conduct fine regulation when the brake gear is actuated can be enhanced by controlling the slewing motor 1 by both the directional control valve 2 and the shadow valve 10.

It is to be understood that the foregoing description is merely illustrative of preferred embodiments of the invention, and that the scope of the invention is not to be limited thereto, but is to be determined by the scope of the appended claim.

What is claimed is:

1. A hydraulic circuit system for use in hydraulically operated vehicles, comprising:
    (a) a forwardly and reversely rotatable slewing motor having a brake unit associated therewith and hydraulic fluid circuits for rotating said slewing motor forwardly and reversely;
    (b) a directional control valve for connecting and disconnecting said fluid circuits with and from a pressurized fluid supply source, said control valve having an OFF position and forward and reverse rotating positions and being remotely controlled by a pilot fluid pressure;
    (c) bypass circuits, one ends of which are respectively connected to said fluid circuits;
    (d) a shadow valve having a communicating position for allowing said bypass circuits to communicate with each other at their respective other ends and disconnecting positions for disconnecting said bypass circuits from each other, said shadow valve being interlocked with said directional control valve to enable interlocked control to be achieved in such a manner that it may assume its communicating position when said directional control valve is located at its OFF position, while it may assume its disconnecting positions when said directional control valve is located at either forward or reverse rotating position, and
    (e) an ON-OFF changeover valve provided in said bypass circuits for allowing said bypass circuits to communicate with and disconnect from said shadow valve.

2. A hydraulic circuit system as claimed in claim 1 wherein between said bypass circuits and said shadow valve, a cavitation preventing circuit is connected through check valve means so as to allow said bypass circuits to communicate with each other in co-operation with said shadow valve.

3. A hydraulic circuit system as claimed in claim 2 wherein said cavitation preventing circuit is connected through check valve means to a drain circuit.

4. A hydraulic circuit system as claimed in claim 2, further comprising a second cavitation preventing circuit connected through check valve means between said bypass circuits and a drain circuit.

* * * * *